United States Patent Office 3,658,852
Patented Apr. 25, 1972

---

3,658,852
PRODUCTION OF TRIMETHYL-P-BENZOQUINONE
Ludwig Schuster and Horst Pommer, Ludwigshafen, Germany, assignors to Badische Anilin- & Soda-Fabrik Aktiengesellschaft, Ludwigshafen (Rhine), Germany
No Drawing. Filed Aug. 5, 1969, Ser. No. 847,726
Claims priority, application Germany, Aug. 13, 1968,
P 17 93 183.8
Int. Cl. C07c 49/64
U.S. Cl. 260—396 R          11 Claims

ABSTRACT OF THE DISCLOSURE

The production of trimethyl-p-benzoquinone by oxidation of 2,3,6-trimethylphenol in the presence of a cobalt complex salt and an amide bearing two substituents on the nitrogen atom. The product is a valuable starting material for the production of pharmaceutical products.

---

This invention relates to a process for the production of trimethyl-p-benzoquinone by oxidation of 2,3,6-trimethylphenol in the presence of a cobalt complex salt and an amide having two substituents on the nitrogen atom.

It is known that 2,3,5-trimethylphenol can be oxidized to trimethyl-p-benzoquinone by means of potassium nitroso disulfonate (I. K. Saryčeva, V. obsc. Chim., volume 31, page 2190 (1961). Furthermore the oxidation of 3,5-dimethylphenol and of 2,5-dimethylphenol to the corresponding dimethyl-p-benzoquinones by means of an equimolar amount of nitric oxide and nitrogen dioxide or of sodium nitrite in concentrated sulfuric acid has been described (Austrian patent specification No. 208,848). Another method for the oxidation of 2,3,6-trimethylphenol to the corresponding p-quinone uses sodium bichromate in sulfuric acid (Journal of Organic Chemistry, volume 4, page 318 (1939)). All these methods require at least equimolar amounts of oxidizing agent; only moderate yields of end product are obtained.

It is also known that 2,3-dimethylphenol, 2,5-dimethylphenol, 2,6-dimethylphenol, 3,5-dimethylphenol and 2,3,5,6-tetramethylphenol can be oxidized to the corresponding p-benzoquinones by using oxygen as the oxidizing agent and bissalicylideneethylenediiminocobalt (II), also known as Salcomin (Recueil des Travaux Chimiques des Pays Bas, volume 86, (1967), page 520), as oxygen carrier. Oxidation is carried out in methanol or chloroform. Satisfactory yields are also not achieved with this process, the dimethylphenols are reacted only slowly and in some cases incompletely, and compounds of high molecular weight may be formed as byproducts by coupling of aryloxy radicals.

It is an object of this invention to provide a new process for the production of trimethyl-p-benzoquinone in better yields and higher purity and by a simpler and more economical method.

This and other objects are achieved and the production of trimethyl-p-benzoquinone by reaction of a trimethylphenol with oxygen in the presence of cobalt complex salts of Schiff's bases and an organic solvent, is advantageously carried out by effecting the reaction of 2,3,6-trimethylphenol with oxygen in the presence of a cobalt complex salt having the general formula:

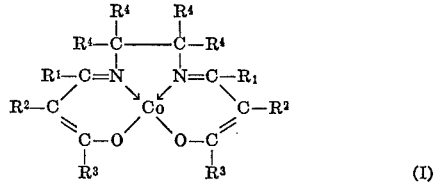

in which the radicals $R^1$, $R^2$, $R^3$ and the individual radicals $R^4$ may be identical or different and each denotes a hydrogen atom or an aliphatic radical, and $R^2$ and $R^3$ together with the two carbon atoms of the adjacent double bond may also form an aromatic ring, and in the presence of an open or cyclic amide bearing two substituents on the nitrgoen atom as solvent.

As compared with the prior art methods, the process according to the invention gives trimethyl-p-benzoquinone in better yields and higher purity and in a simpler and more economical manner. It is surprising that these advantageous results are achieved without the formation of substantial amounts of byproducts, for example by coupling of aryloxy radicals, and at higher reaction rates.

In the process according to the invention the 2,3,6-trimethylphenol is oxidized with oxygen or a mixture containing oxygen, for example air. The two starting materials are reacted with each other while passing in oxygen or a gas containing oxygen. The oxidation is advantageously carried out at a temperature of from 25° to 50° C., preferably from 35° to 45° C., at atmospheric or preferably at super atmospheric pressure, continuously or batchwise. It is advantageous to use pressures of from 1 atmosphere to 20 atmospheres if particularly high oxidation rates are to be achieved, if necessary with cooling of the reaction mixture.

Preferred cobalt complex salts (I) are those in whose general Formula I the radicals $R^1$, $R^2$, $R^3$ and the individual radicals $R^4$ are identical or different and each denotes a hydrogen atom or an alkyl radical having one to four carbon atoms, and $R^2$ and $R^3$ together with the two carbon atoms of the adjacent double bond may also form a phenyl ring. Thus, in addition to bissalicylideneethylenediiminocobalt (II), cobalt complex salts which have been prepared from the following components may be used as substances (I): 1,2-propylenediamine, 1,2-dimethylethylenediamine or 1-methyl-2-ethylethylenediamine (instead of ethylenediamine as the base); dicarbonyl compounds such as acetylacetone, heptanedione-(4,6) and 4-acetylpentanone-(3) (instead of salicylaldehyde as β-hydroxycarbonyl compound). The cobalt complex salt is generally used in an amount of from 1 to 15%, preferably from 3 to 10%, by weight with reference to 2,3,6-trimethylphenol.

The reaction is carried out in the presence of an open or cyclic amide bearing two substituents on the nitrogen atom as solvent, preferably in solutions of from 5 to 40%, particularly from 5 to 30%, by weight of 2,3,6-trimethylphenol with reference to amide. Preferred amides are those having the general formula:

in which R', R", R may be identical or different and each denotes an alkyl radical having from one to three carbon atoms, R may also denote a hydrogen atom or R and R" together with the adjacent —C—N— group may form a five- or six-membered heterocyclic ring. Dimethylformamide is particularly advantageous as a solvent because its high flashpoint and ignition point enable the oxidation to be carried out in a reliable and economical manner on an industrial scale. Examples of other suitable amides are N,N-diethylformamide and N-methyl-pyrrolidone.

The reaction may be carried out for example as follows:

Oxygen or air is passed into a mixture of 2,3,6-trimethylphenol, cobalt complex salt (I) and solvent with good mixing. The reactor may be for example a stirred vessel having a gas-feed stirrer, a bubbler, or, in continuous operation, a cascade of stirred vessels, a tray column or successive tray columns. The reaction mixture is left at the reaction temperature with further passage of oxygen (air) therethrough until complete oxidation has taken place; it is then concentrated and the residue is treated with a suitable solvent, for example ether, petroleum ether, cyclohexane or benzene. The solvent suspension, for example ether suspension, is filtered and the filter residue is washed several times with ether. The end product is then separated from the combined ether filtrates by fractional distillation. Instead of extracting the end product from the residue with solvents, it may also be isolated by steam distillation or distilled off in a film evaporator.

The compound which can be prepared by the process according to the invention is a valuable starting material for the production of pharmaceutical products, for example α-tocopherol (Ullmanns Encyklopädie der technischen Chemie, volume 18, pages 241 et seq.).

The invention is illustrated by the following example, in which parts are by weight.

EXAMPLE 3000 parts of dimethylformamide, 170 parts of trimethylphenol and 17 parts of bissalicylideneethylenediiminecobalt(II) are placed in a stirred vessel. This solution is gassed with pure oxygen while mixing well. The temperature of the mixture rises within seventeen minutes from 25° to 45° C. and is then kept at 45° C. by external cooling. Forty-five minutes later 40 parts of oxygen has been absorbed and the reaction is stopped. The dimethylformamide is distilled off from the mixture in vacuo, the residue is taken up in ether, filtered and washed with ether until the filtrate no longer shows the yellow color of the quinone. 24.9 parts of a dark brown powder remains as a residue. 171.8 parts (equivalent to 91.6% of the theory) of trimethyl-p-benzoquinone is obtained from the filtrate by distillation at 65° to 70° C. at 0.2 mm. Hg.

We claim:

1. A process for the production of trimethyl-p-benzoquinone which comprises reacting 2,3,6-trimethylphenol with oxygen at a temperature of from 25° C. to 50° C., in the presence of a cobalt complex salt having the formula:

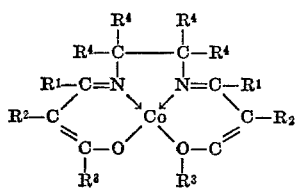

in which the radicals $R^1$, $R^2$, $R^3$ and the individual radicals $R^4$ may be identical or different and each denotes hydrogen or alkyl of 1 to 4 carbon atoms, and $R^2$ and $R^3$ together with the two carbon atoms of the adjacent double bond may also form a phenyl ring, and also in the presence of a solvent which is an amide having the formula

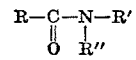

in which R, R' and R" may be identical or different and each denotes an alkyl radical having one to three carbon atoms, R may also denote a hydrogen atom, or R and R" together with the adjacent —C—N— group may form a five-membered or six-membered heterocyclic ring.

2. A process as claimed in claim 1 wherein the reaction is carried out with air.

3. A process as claimed in claim 1 wherein the reaction is carried out at a temperature of from 35° to 45° C.

4. A process as claimed in claim 1 wherein the reaction is carried out at a pressure of from 1 atmosphere to 20 atmospheres.

5. A process as claimed in claim 1 wherein the reaction is carried out with bissalicylideneethylenediiminocobalt(II) as the complex salt.

6. A process as claimed in claim 1 wherein the reaction is carried out with a cobalt complex salt in an amount of 1 to 15% by weight with reference to 2,3,6-trimethylphenol.

7. A process as claimed in claim 1 wherein the reaction is carried out with a cobalt complex salt in an amount of from 3 to 10% by weight with reference to 2,3,6-trimethylphenol.

8. A process as claimed in claim 1 wherein the reaction is carried out in a solution of from 5 to 40% by weight of 2,3,6-trimethylphenol with reference to the amide.

9. A process as claimed in claim 1 wherein the reaction is carried out in a solution of from 5 to 30% by weight of 2,3,6-trimethylphenol with reference to the amide.

10. A process as claimed in claim 1 carried out in the presence of dimethylformamide.

11. A process as claimed in claim 1 wherein said solvent is an amide selected from the group consisting of dimethylformamide, N,N - diethylformamide and N-methyl-pyrrolidone.

References Cited

UNITED STATES PATENTS

| | | | |
|---|---|---|---|
| 3,455,880 | 7/1969 | Kobayaski et al. | 260—396 |
| 3,213,114 | 10/1965 | Braxton et al. | 260—396 |
| 3,306,874 | 2/1967 | Hay | 260—396 |
| 3,415,849 | 12/1968 | Warrel | 260—396 |

LORRAINE A. WEINBERGER, Primary Examiner

V. GARNER, Assistant Examiner

U.S. Cl. X.R.

260—345.2

PO-1050
(5/69)

UNITED STATES PATENT OFFICE
CERTIFICATE OF CORRECTION

Patent No. 3,658,852      Dated April 25, 1972

Inventor(s) Ludwig Schuster and Horst Pommer

It is certified that error appears in the above-identified patent and that said Letters Patent are hereby corrected as shown below:

Column 2, line 17, "nitrgoen" should read -- nitrogen --.

Column 3, line 39, "iminecobalt" should read -- iminocobalt --.

Column 3, claim 1, that portion of the formula reading
"$\underset{R^3}{O-C}$" should read -- $\underset{R^3}{O-C}$ --.

Signed and sealed this 28th day of November 1972.

(SEAL)
Attest:

EDWARD M. FLETCHER, JR.
Attesting Officer

ROBERT GOTTSCHALK
Commissioner of Patents